United States Patent [19]

Moore et al.

[11] Patent Number: 4,782,134
[45] Date of Patent: Nov. 1, 1988

[54] METHOD FOR IMPROVING THE MELT FLOW RATE OF POLYSTYRENE

[75] Inventors: Eugene R. Moore; Rudolph Lindsey, Jr.; Brian D. Dalke, all of Midland, Mich.

[73] Assignee: The Dow Chemical Company, Midland, Mich.

[21] Appl. No.: 920,409

[22] Filed: Oct. 20, 1986

[51] Int. Cl.$^4$ .............................. C08F 6/00; C08J 9/18; B29B 13/04

[52] U.S. Cl. .................................... 528/483; 528/503; 521/97; 521/146; 525/241; 264/328.17; 264/331.17; 264/345; 264/348

[58] Field of Search ............... 528/483, 503; 523/312, 523/330; 521/97, 146; 264/82, 85, 83, 328.17, 331.17, 345, 348; 525/383, 388, 333.3, 938, 241

[56] References Cited

U.S. PATENT DOCUMENTS

| | | | |
|---|---|---|---|
| 2,216,834 | 10/1940 | Buskirk | 521/97 X |
| 2,530,852 | 11/1950 | Bixby | 528/483 X |
| 2,576,977 | 12/1951 | Stober | 521/97 X |
| 2,774,991 | 12/1956 | McCurdy et al. | 18/48 |
| 2,845,659 | 8/1958 | Calvert | 521/97 X |
| 2,980,661 | 4/1961 | Twaddle et al. | 528/483 |
| 3,177,193 | 4/1965 | Scott, Jr. | 528/483 X |
| 3,389,197 | 6/1968 | Flynn et al. | 528/483 |
| 3,689,613 | 9/1972 | Talalay | 264/83 |
| 3,700,639 | 10/1972 | Hulse et al. | 528/483 X |
| 3,789,093 | 1/1974 | Bose | 264/37 |
| 3,801,520 | 4/1974 | Hogan et al. | 528/483 X |
| 3,862,284 | 1/1975 | Dixon et al. | 264/83 |
| 4,206,293 | 6/1980 | Kruse | 525/243 |
| 4,483,888 | 11/1984 | Wu | 528/483 X |
| 4,703,105 | 10/1987 | Allada | 528/483 |

OTHER PUBLICATIONS

"The Merck Index", (9th ed.) Windholz, M. (ed.) Merck and Co., N.J. (1976) pp. 230–231.
Translation of Ger. Offen. 3,323,940 to Braun et al.

Primary Examiner—Joseph L. Schofer
Assistant Examiner—F. M. Teslein
Attorney, Agent, or Firm—Price, Heneveld, Huizenga & Cooper

[57] ABSTRACT

The specification discloses a method for assuring consistent and, if desired, increased melt flow rate in a vinyl aromatic based polymer by controlling the degree of absorption of carbon dioxide, oxygen and/or argon for a substantial period of time immediately prior to introduction of the polymer into a molding machine.

18 Claims, No Drawings

METHOD FOR IMPROVING THE MELT FLOW RATE OF POLYSTYRENE

CROSS-REFERENCE TO RELATED APPLICATION

This application is a continuation-in-part of application Ser. No. 06/830,039, filed Feb. 18, 1986, now abandoned, and entitled METHOD FOR IMPROVING THE MELT FLOW RATE OF POLYSTYRENE.

BACKGROUND OF THE INVENTION

The present invention relates to vinyl aromatic based polymers, including polymer blends, such as polystyrene, high impact polystyrene, styrene acrylonitrile, ABS and other rubber modified styrene copolymers. Such vinyl aromatic based polymers are noted in the industry for wide variations in melt flow rate. Melt flow rate analysis of such polymers yields wide variations in both repeatability and reproducibility in melt flow rate determinations.

When injection molding machines are being operated at or near their optimum in high productivity, a small difference in melt viscosity, as characterized by melt flow rate, will make a large difference in machine productivity of flaw-free parts. A higher melt flow rate with the same heat distortion temperature allows shorter injection cycles, which allows more parts to be produced per unit time. If the melt flow rate begins to drift lower, various defects in the part develop. These may, for example, range from weak weld lines or visible weld lines in a multi-gated mold, to visible surface defects, sink marks, edge defects, lighter parts, and finally to a short shot, as the given cycle causes insufficient material to flow into the mold.

If the melt flow rate should drift upward, other difficulties are seen due to overfilling of the mold. These may, for example, take the form of increased part weights which may cause several problems. The least of these problems is perhaps the added cost of the material; more severe are mold release problems, due to the thicker molded part being bigger than the mold (once pressure is released). Sometimes this sticking causes the cycle to be stopped while the part is forced out. Other times the part may be broken due to the force needed to expel it.

A "permanent" increase in melt flow rate, however, results in a shorter and more productive molding cycle, if heat distortion temperature (solidification temperature) is not lowered.

With the use of many plasticizers, such as mineral oil, the melt flow rate can be increased, but at the same time the heat distortion temperature is lowered. This results in parts that have an undesired lower use temperature and lengthens the molding cycle by requiring greater cooling time in the mold (the part must be solidified before it is removed from the mold or it will deform).

SUMMARY OF THE INVENTION

In the present invention, we have discovered a method for assuring consistent and, if desired, increased melt flow rate in a given vinyl aromatic based polymer by controlling the degree of absorption of an activating gas (carbon dioxide, oxygen and/or, to a lesser degree, argon) for a substantial period of time immediately prior to introduction of the polymer into a molding machine. As a result of the present invention, a user can count on obtaining a consistent melt flow rate from a given vinyl aromatic based polymer by following the same "conditioning" procedure in accordance with the present invention immediately prior to molding.

DESCRIPTION OF THE PREFERRED EMBODIMENT

In the preferred embodiment, the degree of activating gas absorption is controlled so as to increase the melt flow rate. The degree of absorption is a function of several factors:
1. temperature;
2. concentration of the activating gas in the atmosphere to which the vinyl aromatic based polymer is exposed;
3. time of exposure to the controlled atmosphere;
4. particle size of the polymer.

These variables are interdependent to differing degrees. Temperature and concentration of carbon dioxide, oxygen and/or argon are probably the most sensitive and therefore significant of the variables.

Carbon dioxide, oxygen and to a lesser degree argon are effective in increasing the melt flow rate of vinyl aromatic based polymers either singly, or in combination. Carbon dioxide and oxygen, either alone or in combination, appear to be the most effective. Surprisingly, argon is also effective to increase melt flow rate, though to a lesser degree than oxygen or carbon dioxide. Yet nitrogen which, like argon, is essentially inert, is not effective in increasing melt flow rate of vinyl aromatic polymers. For convenience, the term "activating gas" as used herein means any one of or any combination of carbon dioxide, oxygen and argon.

The vinyl aromatic based polymer is exposed to the carbon dioxide, oxygen and/or argon environment at temperatures below the softening point of the polymer. Preferably, the temperature is at or below 80 degrees C., and most preferably is considerably lower. The lower the temperature, the greater the absorption of the activating gas and the higher the melt flow rate achieved. With high temperature conditioning (e.g., 80 degrees C.), a stable, lower melt flow rate is obtained which allows an injection molder to produce consistently good, flaw-free parts. By lowering the temperature, substantial increases in melt flow rate can be obtained without a corresponding loss in heat distortion temperature or in flexural strength as would result from increasing melt flow rate by lowering molecular weight.

The concentration of carbon dioxide and oxygen in standard atmosphere is sufficient to achieve effective conditioning in accordance with the present invention. Substantial increases in melt flow rate can be achieved by exposing the vinyl aromatic polymer to atmosphere at lower temperatures.

On the other hand, one can increase the concentration of carbon dioxide, oxygen and/or argon in the environment to which the polymer is exposed and thereby obtain further increases in melt flow rate at a given temperature. By increasing the concentration of the activating gas, one can obtain desired increases in melt flow rate without having to excessively cool the polymer.

The time of exposure is a less sensitive variable. Typical exposures are from two hours to several days. Less time can be used by exposing the polymer at lower temperatures or to an atmosphere containing a higher activating gas content. Greater time of exposure may be desirable in other circumstances.

Particle size of the polymer will also influence rate of absorption of activating gas. Typical commercial sizes are operable, e.g., 0.5 to 5 grams per 100 particles. Experiments discussed herein used material comprising two (2) grams per 100 particles.

This invention is most effective when practiced with a very pure polystyrene, containing a minimum of unreacted styrene and a minimum of dimers and trimers. Polystyrene can be made purer by stripping techniques to reduce styrene monomer content. Dimers and trimers can be reduced by lowering the temperature and using chemical (rather than thermal) initiation. Preferably, this technique is practiced with anionic polystyrene which has less than 20 parts per million styrene monomer and almost no dimer and trimer.

The specific temperature, concentration of activating gas, time employed and particle size desired for a given vinyl aromatic polymer can readily be determined empirically by those skilled in the art. An operator may want to vary these factors for different molding machines. Except in the case of foamed plastics, the operator must be careful to avoid excessive carbon dioxide absorption lest the product exhibit undesirable foaming in the molding equipment.

Methods for controlling the temperature of the environment to which the polymers are exposed are well-known to those skilled in the art. Similarly, conventional techniques can be used for controlling the activating gas content of the environment. These might include introduction of the activating gas into an air stream, enrichment using membrane technology, or in the case of carbon dioxide, stoichiometric burning of methane or the like with air to produce a stream of carbon dioxide. The activated gas enriched stream would then be passed through a bed of the vinyl aromatic polymer preferably in a hopper located on the molding equipment.

It is important that the polymer be molded immediately upon completion of conditioning. Naturally, some latitude of time may be necessary and is acceptable. However, given the fact that conditioning can be achieved in from two hours to several days, it will be readily apparent to those skilled in the art that it is most preferable to process the polymer within a few minutes after conditioning is completed. This can be achieved by conditioning the polymer in a hopper mounted on or near the molding equipment as suggested above.

EXPERIMENTAL RESULTS

In Examples 1-6, polystyrene material was subjected to variations in temperature and carbon dioxide content. The polystyrene used was Styron TM 680 available from The Dow Chemical Company, Midland, Mich. The particle size was such that 100 particles weighed 2 grams. Melt flow rate was determined in accordance with ASTM Testing Procedure D1238, using a 5 kilogram load at 200 degrees C.

EXAMPLE 1

Example 1 is a control in which an attempt was made to purge the polystyrene of $CO_2$ A sample of the aforesaid polystyrene (Styron TM 680) was stored for 96 hours at 0 degrees F. in a pure nitrogen atmosphere. The melt flow (200 degrees C., 5kg) rate was found to be 10.6 grams in 10 minutes.

EXAMPLE 2

The material of Example 1 was exposed to the normal atmosphere containing ambient amounts of $CO_2$ at −17.8 degrees C. (0 degrees F.) for 96 hours. The MFR was measured and found to be 12.6 grams/10 minutes.

EXAMPLE 3

The material of Examples 1 and 2 was exposed at 80 degrees C. and to atmosphere with ambient $CO_2$ content for 2 hours and the resulting MFR was found to have returned to the original 10.6 grams/10 minutes. This indicates that substantially all of the atmospheric $CO_2$ had been removed.

EXAMPLE 4

Another sample of Styron TM 680 with a slightly different "inherent" MFR was conditioned at a variety of temperatures under prevailing atmospheric conditions for 4 hours and the MFR's were as follows:

| Temp. | MFR |
| --- | --- |
| Room Temp. (approx. 70° F. or 20° C.) | 11.43 gm/10 min. |
| 35° F. | 12.27 gm/10 min. |
| 0° F. | 12.92 gm/10 min. |
| −35° F. | 13.8 gm/10 min. |

EXAMPLE 5

The resin of Example 4 was placed in a container through which a constant stream of air was passed so as to provide contact between such moving air stream and the resin granules. A variable stream of $CO_2$ was added into said air stream to control the relative $CO_2$ content of the gases in contact with the polymer.

By holding the polymer at room temperature (about 70 degrees F.), it is found that ambient air again gives a MFR of 11.43 gm/10 min. By increasing the $CO_2$ in steps, and allowing 4 hours for equilibrium at each step, after some trial and error, the following near reproduction of the results of Example 4 is found:

| Amount of $CO_2$ Added to Air Stream at 70 degrees F. | MFR |
| --- | --- |
| None | 11.4 |
| Low | 12.3 |
| Medium | 13.0 |
| High | 13.8 |

EXAMPLE 6

When Example 5 is repeated at elevated temperatures up to, about 80 degrees C., similar results are seen, except that higher $CO_2$ flow rates are required as the temperature is increased.

EXAMPLE 7

A sample of a high impact polystyrene was equilibrated for 96 hours at the indicated temperatures, then the MFR was measured:

| Original Temp. | MFR |
| --- | --- |
| Room Temp. (about 70° F.) | 3.17 |
| 0° F. | 3.57 |

EXAMPLE 8

A sample of polystyrene produced by The Dow Chemical Company under the designation of XP71008 was exposed to ambient $CO_2$ containing air at room temperature for 48 hours and its MFR was determined. Then, the same material was exposed to an atmosphere of pure $CO_2$ for 24 hours, also at room temperature. The results were as follows:

| Gas | MFR |
| --- | --- |
| Air | 6.88 |
| Pure $CO_2$ | 10.31 |

While the material exhibited a great increase in MFR, the level of $CO_2$ was high enough to cause foaming. While this would be suitable and desirable for molding foamed parts, it would cause flaws in most nonfoamed injection molded parts.

It is found that pure $CO_2$ can be used if the temperature is elevated above room temperature until the MFR rate attained is about 9.0. An injection molding of this material will be found to have no objectionable flaws, still retain the original heat distortion temperature and strength, yet will have a 10% reduction in molding cycle compared to the 6.88 MFR blanks.

EXAMPLES 9 THROUGH 16

In Examples 9 through 16, the same polystyrene material used in Examples 1 through 6 was stored for five days under the various conditions shown in Table 1 below. The resulting melt flow rates are also indicated in Table 1.

TABLE I

| | Conditions | MFR (200 C.; 5 kg) |
| --- | --- | --- |
| Example 9 | Control (R.T. in air) | 11.1 gms |
| Example 10 | Cool air (0 degrees F.) | 12 to 13 |
| Example 11 | Pure $O_2$ (0 degrees F.) | 17 (Clear Strand) |
| Example 12 | Pure $O_2$ (0 degrees F.) | 16+ (Foam Strand) |
| Example 13 | 50% $CO_2$ (0 degrees F.) | 13.0 |
| Example 14 | Argon (0 degrees F.) | 13.0 (Rough Strand) |
| Example 15 | Nitrogen (0 degrees F.) | 10.2 |
| Example 16 | VAC (0 degrees F.) | 10.2 |

As can be seen, the polystyrene exposed to nitrogen or to a vacuum shows a melt flow rate (200 degrees C. under a 5 kilogram load) of 10.2 gm per 10 min. (Examples 15 and 16). Simply exposing the polystyrene to air at room temperature increases the melt flow rate to 11.1 gm per 10 min. (Example 9). By exposing the polystyrene to cool air (0 degrees F.), one increases the melt flow rate to 12 to 13 gm per 5 min. (Example 10). Obviously, the activating gases here are primarily oxygen and carbon dioxide.

By exposing the polystyrene to pure oxygen at 0 degrees F., a melt flow rate of 17 is achieved. An injection molded strand remained clear, with no signs of foam. This minimizes the possibility of molding imperfections.

Exposure to pure carbon dioxide at 0 degrees F. also substantially increase the melt flow rate, i.e., to 16+ gm per 10 min. (Example 12). However, injection results in foamed strands which under some circumstances would be unacceptable for injection molding purposes. For circumstances where foaming is unacceptable, one might follow the procedure of Example 13, using a 50% $CO_2$, 50% air environment at 0 degrees F. Melt flow rate was increased to 13 gm. per 10 min. under those circumstances.

Similarly, exposure to argon at 0 degrees F. results in an increase in melt flow rate to 13 gm. per 10 min. The injected polystyrene did show a slight tendency to foam, as indicated by a rough strand. However, in many applications, this would be no problem.

EXAMPLE 17

In this example, the polystyrene resin exposed to nitrogen (Example 15) was injection molded and the conditions noted to serve as a control. Then, the polystyrene exposed to pure oxygen (Example 11) and the polystyrene exposed to pure argon (Example 14) were also injection molded in order to determine what improvements in molding conditions could be obtained vis-a-vis the polystyrene exposed to nitrogen at 0 degrees F.

The polystyrene exposed to pure oxygen could be injection molded at temperatures 25 degrees C. lower than those for the nitrogen exposed polystyrene without producing any defects in the molded parts (e.g. short shot, flow lines, etc.). This lower injection temperature allows the cooling cycle to be shortened significantly. The cycle was shortened in repeated runs until defective parts (slightly warped) were formed, and then lengthened again slightly until perfect parts were again produced. The optimum overall cycle time for Example 11 polystyrene is 33% shorter than that for injection molding the polystyrene exposed to nitrogen (Example 15), demonstrating the surprising effectiveness of exposure to oxygen in cutting cycle time.

Following the same procedure for the polystyrene exposed to argon, it was found that a reduction in cycle time of 14% could be effected, thus demonstrating that argon has the same beneficial effect as oxygen, and indeed carbon dioxide, only to a somewhat lesser degree.

CONCLUSION

Thus, it can be seen that the present invention makes it possible to obtain consistent, and preferably increased, melt flow rates in vinyl aromatic based polymers. The term polymers is intended to encompass polymer blends, unless otherwise specifically stated. Of course, it is understood that the foregoing is merely a preferred embodiment of the invention, and that various changes and departures can be made without departing from the spirit and broader aspects thereof.

The embodiments of the invention in which an exclusive property or privilege is claimed are defined as follows:

1. A method for stabilizing and controlling melt flow rate of a batch of particulate polymeric materials selected from the group consisting of vinyl aromatic polymrs and blends of polymers containing at least one vinyl aromatic polymer, whereby the melt flow rate of said batch is substantially consistent and can be increased, remain substantially the same or be decreased, comprising:

selecting a desired melt flow rate for said batch; and contacting under approximatley ambient pressure said batch of polymeric materials with an activating gas selected from the group consisting of carbon dioxide, oxygen, argon and mixtures thereof for a substantial period of time sufficient for said polymeric materials to absorb said gas in an amount effective to provide said desired melt flow rate:

maintaining said polymer at a temperature below 80 degrees C. during said substantial period of time; and terminating said contact between said activating gas and said batch of polymeric materials immediately prior to introduction of the polymeric materials into a molding machine.

2. The method of claim 1 wherein said batch of polymeric materials is contacted with said activating gas at a constant temperature.

3. The method of claim 2 in which said temperature is maintained below 20 degrees C.

4. The method of claim 3 in which said batch of polymeric materials is contacted in an atmosphere containing said activating gas in excess of that found in standard atmosphere.

5. The method of claim 4 in which said batch of polymeric materials is contacted in an atmosphere containing said activating gas by conducting a stream of gas containing said activating gas through a bed of polymer particles.

6. The method of claim 5 in which said polymer is contacted in an atmosphere containing said activating gas for at least 2 hours.

7. The method of claim 6 in which said polymer is granulated such that approximately 100 particles weigh between about 0.5 and 5 grams.

8. The method of claim 7 in which said polymeric material is contacted with said activating gas in a hopper mounted in proximity to a molding machine.

9. The method of claim 1 in which said polymeric materials are contacted in an atmosphere containing said activating gas in excess of that found in standard atmosphere.

10. The method of claim 9 in which said polymeric materials are contacted in an atmosphere containing said activating gas by conducting a stream of gas containing said activating gas through a bed of polymer particles.

11. The method of claim 10 in which said polymeric materials are contacted in an atmosphere containing said activating gas for at least two hours.

12. The method of claim 11 in which said polymer is granulated such that approximately 100 particles weigh between about 0.5 and 5 grams.

13. The method of claim 10 in which said polymer is granulated such that approximately 100 particles weigh between about 0.5 and 5 grams.

14. The method of claim 1 in which said polymeric materials are contacted in an atmosphere containing said activating gas for at least two hours.

15. The method of claim 1 in which said polymer is granulated such that approximately 100 particles weigh between about 0.5 and 5 grams.

16. The method of claim 1 in which said contact of said polymeric materials with said activating gas is conducted in a hopper mounted in proximity to a molding machine.

17. The method of any of claims 1,2,3-8 and 9-16 in which said vinyl aromatic polymer comprises polystyrene.

18. The method of any of claims 1,2,3-8 and 9-16 in which said vinyl aromatic polymer comprises an anionic polystyrene with less than 20 ppm styrene monomer and negligible amounts of dimer and trimer.

* * * * *